(12) United States Patent
Ahm et al.

(10) Patent No.: US 7,421,960 B2
(45) Date of Patent: Sep. 9, 2008

(54) MACHINE FOR BEDDING OUT SEED OR PLANT TAPES

(76) Inventors: Poul Henrik Ahm, Edf. Mar Bella, Atico A Calle San Pedro, 43, E-03590 Altea (Alicante) (ES); Carsten Andersen, Teglbaekvej 15, DK-8361 Hasselager (DK)

(*) Notice: Subject to any disclaimer, the term of this patent is extended or adjusted under 35 U.S.C. 154(b) by 176 days.

(21) Appl. No.: 10/575,435
(22) PCT Filed: Oct. 20, 2004
(86) PCT No.: PCT/DK2004/000720

§ 371 (c)(1),
(2), (4) Date: Apr. 11, 2006

(87) PCT Pub. No.: WO2005/036946

PCT Pub. Date: Apr. 28, 2005

(65) Prior Publication Data
US 2007/0137871 A1 Jun. 21, 2007

(30) Foreign Application Priority Data
Oct. 20, 2003 (DK) .............................. 2003 01535

(51) Int. Cl.
*A01C 7/00* (2006.01)
*F16L 1/028* (2006.01)
(52) U.S. Cl. ........................................ 111/199; 405/176
(58) Field of Classification Search ................. 111/199, 111/200, 100–117; 47/56; 405/176
See application file for complete search history.

(56) References Cited

U.S. PATENT DOCUMENTS 4,829,915 A * 5/1989 Ahm ........................... 111/105
5,996,513 A * 12/1999 Nanbu et al. ................. 111/105

* cited by examiner

*Primary Examiner*—Christopher J. Novosad
(74) *Attorney, Agent, or Firm*—Cooper and Dunham, LLP

(57) ABSTRACT

A machine for bedding out seed or plant tapes includes a frame and a carrying pole to be connected to a front of a tractor frame. At least one bedding out unit is provided with a plough member mounted on the frame. The plough member is associated with a conveyor including at least one continuous belt. The bedding out unit is provided with a supporting plate for supporting at least one supply container for the seed or plant tape to be bedded out in a furrow produced by the plough member. The bedding out unit includes a plough member of a substantially U-shaped cross section. Top webs of the U are substantially horizontally projecting stabilizing webs. The plough member is of a length (L) of at least approximately 30 cm and a width (b) measured across the U of 15 to 50 mm. The conveyor of the plough member is formed by an inclined main conveyor with two continuous conveyor belts arranged adjacent, but with a distance (a) to one another. The main conveyor extends over most of the entire length (L) of the plough member. The supporting plate is adjustable with respect to at least one of height and angle, and at least two pressure wheels are mounted on a rear end of the machine for pressing down the earth around the seed or plant tape portion which has just been bedded out in the furrow. A pre-conveyor is provided between the supporting plate for the supply container and the main conveyor. The pre-conveyor is adapted to run at a speed slightly slower than a speed of the main conveyor. The pre-conveyor is mounted on a slide reciprocable in the longitudinal direction of the machine. A pair of co-acting separation rollers is mounted between the main conveyor and the pre-conveyor, a peripheral speed of the separation rollers corresponding substantially to an advancing speed of the main conveyor.

17 Claims, 6 Drawing Sheets

MACHINE FOR BEDDING OUT SEED OR PLANT TAPES

TECHNICAL FIELD

The invention relates to an optionally self-propelling machine for bedding out seed or plant tapes and including a frame, where at least one bedding out unit provided with a plough member is mounted on said frame, said machine further including a carrying pole to be connected to the front of a tractor frame, and where the plough member is associated with a conveyor including at least one continuous belt, as well as where the bedding out unit is provided with a supporting plate for at least one supply container for the seed or plant tape to be bedded out in a furrow produced by the plough member.

BACKGROUND ART

A machine for bedding out seed tapes is known, said machine including a frame on which a bedding out unit is mounted, said bedding out unit being provided with a plough member. The plough member is associated with a conveyor including at least one continuous belt for a completely vertical lowering of so-called germinating units into the furrow. A germinating unit is a pocket filled with seed(s) and fertilizer, said germinating unit being cut off the seed tape. The plough member presents a hollow interior, is rather wide, viz. approximately 85 mm, with the result that the furrow produced by said plough member is rather wide when said plough member is moved through the earth. The latter procedure is not completely satisfying as the germinating units have a tendency to fall over (turn over) in the furrow when they reach the bottom of said furrow. In addition, it is difficult to ensure that the compression of the earth in the furrow around the bedded out germinating unit is such that the structure of the earth, viz. the porosity, the lumps etc. thereof, remains the same as before the furrow was produced by the plough member.

DESCRIPTION OF THE INVENTION

The object of the invention is to provide a machine of the above type which reduces the possibilities of the seed or plant tape of falling over in the furrow, and which furthermore enhances a uniform compression of the earth in the furrow just after said seed or plant tape has been bedded out.

The machine according to the invention is characterised in that the bedding out unit includes a plough member of a substantially U-shaped cross section, where the top webs of the U are substantially horizontally projecting stabilising webs, and where said plough member is of a length L of at least approximately 30 cm and a width (b) measured across the U of 15 to 50 mm, preferably approximately 30 mm, and where the conveyor of said plough member is formed by a very inclined main conveyor with two continuous conveyor belts arranged adjacent, but with a mutual, preferably adjustable distance to one another, said main conveyor extending over most of, preferably substantially the entire length of the plough member, and that the bedding out unit includes a supporting plate which is adjustable with respect to height and/or angle, and that at least two pressure wheels are mounted on the rear end of the machine for a pressing down of the earth around the seed or plant tape length which has just been bedded out. As a result it is ensured that the seed or plant tape cannot fall over immediately after the placing thereof in the furrow because said furrow is relatively narrow. In addition, the pressure wheels ensure that the tape bedded out is compressed exactly so much that the structure, viz. the porosity, the lumps etc. of the earth adjacent the tape bedded out is substantially the same as before said tape was bedded out. The machine presents a very simple structure. The stabilising webs have the effect that the stability of the machine while running is very good, said stability also being enhanced by each bedding out unit being rather low. As the supporting plate is adjustable in height, it is possible in an easy manner to adjust the level of each supply container to the level of the front end of the main conveyor, optionally the front conveyor.

An embodiment of the machine according to the invention is characterised in that a pre-conveyor is inserted between the supporting plate of the supply container and the main conveyor, said pre-conveyor being adapted to run at a speed slightly slower than the speed of the main conveyor, and where said pre-conveyor is optionally mounted on a slide reciprocable in the longitudinal direction of the machine. As a result, it is possible, if necessary, to break the seed and plant tape so as to divide said tape into small units, optionally units including only one seed in each unit.

A pair of co-acting separation rollers may according to the invention be mounted between the main conveyor and the pre-conveyor, where preferably one or the other or both rollers include at least one separation rib, whereby the peripheral speed of said separation rollers can be substantially identical with the advancing speed of the main conveyor. When the seed tape includes many juxtaposed germinating units, the separated germinating unit can be parallelly displaced by the main conveyor in a downward direction and into the furrow while still kept in the vertical position and including a horizontal top edge. When the germinating unit is slightly inclined relative to vertical, said germinating unit continues to be inclined during the movement on the main conveyor.

Moreover, a knife may be mounted between the two conveyors for cutting the seed or plant tape into small tape pieces, where each tape piece includes one or more seeds. The resulting separating procedure is very easy to carry out when it is desired to divide the seed tape up into germinating units.

According to the invention, the supporting plate may be adapted to include many supply containers for the seed or plant tape. As a result, the bedding out of the seed tape or the germinating units can be carried out without necessitating a stop of the tractor and of the machine in order to replace an empty supply container with a filled supply container. These supply containers can optionally be collapsible in such a manner that they only take up very little space on the supporting plate when they have been emptied.

In addition, the main conveyor may according to the invention include two driving rollers, two tightening rollers arranged adjacent one another as well as continuous conveyor belts extending around their respective free guiding webs of a profile guideway presenting a substantially U-shaped cross section. In this manner a particularly good retention of the seed or plant tape or of the germinating units is obtained while said seed or plant tape or said germinating units are slowly moved downwards into the furrow, the free distance between the two inner belt paths of the main conveyor being limited to a relatively small distance, viz. the distance between the two free guiding webs of said profile guideway minus twice the thickness of a continuous belt.

According to the invention, the bottom web of the U-shaped cross section of the profile guideway in the main conveyor may be hinged to the bottom web of the U-shaped cross section of the plough member at the rearmost end of said plough member. Thus, it is possible in a very simple manner to adjust the angle formed by the main conveyor with the longitudinal direction of the plough member.

Moreover, the conveyor belts of the continuous conveyors may according to the invention be made of plastics or textile presenting a high strength, and on the side facing the seed or plant tape or portions thereof these conveyor belts may present a rough surface, said side for instance being coated with emery or be provided with small fraction-producing projections made of rubber or plastics. As a result, these conveyor belts can run for a long period of time without necessitating a replacement thereof. In addition, such conveyor belts present a good grip around the seed or plant tape or around the germinating units to be moved downwards into the furrow.

According to the invention, two auxiliary rollers may be arranged at the rearmost end of the profile guideway, whereby the conveyor belt of the main conveyor can run freely about their respective auxiliary roller. As a result, the friction between the individual conveyor belts and the free webs of the U-shaped cross section of the profile guideway has been reduced.

Furthermore, the front end of the plough member may according to the invention be provided with a nose member of ceramic material for a reduction of the wear and tear on said plough member. The resulting plough member is particularly durable because the nose member is almost impossible to wear out.

According to the invention, the driving rollers may be driven by one or more drive means, such as one or more electromotors supplied with power from the tractor with the result that a very reliable operation of the main conveyor is obtained.

In addition, the outer paths of the continuous belts of the main conveyor may at least partially be covered by a protecting shield. In this manner it is ensured that the continuous belt of the main conveyor is shielded against rain and stray lumps of earth which can destroy the seed or plant tape as well as the germinating units.

Moreover, the top side of the bedding out unit as well as the supporting plate for the supply containers may according to the invention be covered by one or more, preferably transparent protecting shields made of for instance Plexiglass or plastics. As a result, the supply containers are also shielded against rain, stray lumps of earth and dust.

In addition, a sensor may according to the invention be mounted on the plough member, preferably at the end of said plough member, said sensor detecting the speed of said plough member relative to the ground, where said sensor can transmit an electric signal to a preferably remote-controlled program control unit adapted to transmit guide signals to the drive means of the main conveyor and optionally also to the drive means of the pre-conveyor concerning the speeds to be used for running said conveyors relative to the plough member. The resulting guiding of the movement of the seed or plant tape or of the germinating units into the furrow is very accurate. It is possible for the tractor driver to activate the program control unit by means of a remote control in case it is suddenly necessary to run the main conveyor and the pre-conveyor at a different speed than the existing speed.

Moreover, the plough member may according to the invention be of a length of 50 to 150 cm, preferably 100 to 125 cm, especially 110 cm, whereby the angle of the main conveyor relative to horizontal can be adjustable within the angular range of 0 to 45° C., especially 0 to 35° C. As a result, it is easy to set the inlet end of the main conveyor at a specific level corresponding to a level defined in advance of a supply container for the seed and plant tapes.

According to the invention, the carrying pole may be adapted to be secured on a parallelogram suspension on the front end of the tractor. The resulting suspension of the machine on the tractor is particularly reliable.

Finally, the two pressure wheels may according to the invention be wide and slightly inclined to their respective sides relative to the longitudinal mid-plane of the furrow with the result that the earth at the sides of said furrow are compressed in a particularly careful and solid manner against the seed or plant tape or germinating unit just arriving in the furrow.

BRIEF DESCRIPTION OF THE DRAWINGS

The invention is explained in detail below with reference to the drawing, in which.

BEST MODE FOR CARRYING OUT THE INVENTION

Figure 1:
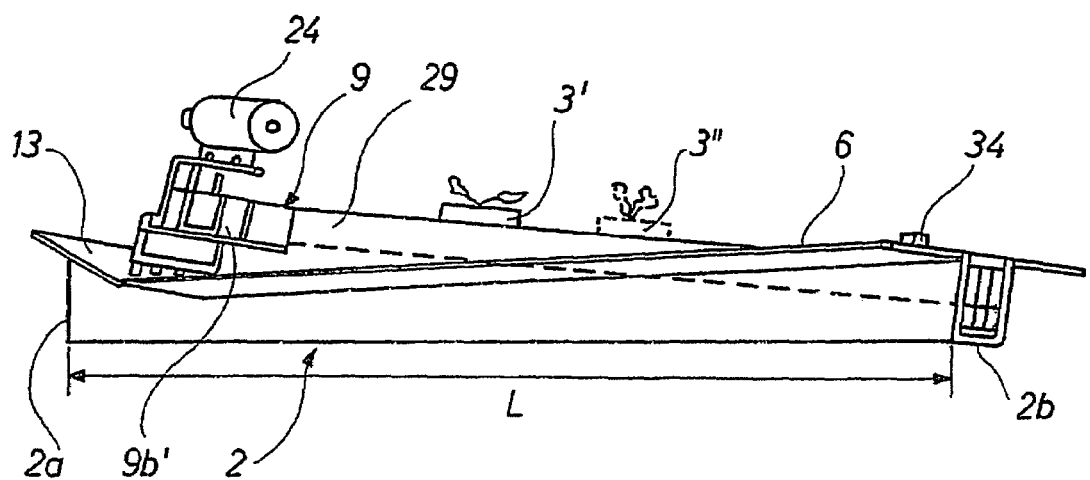
FIG. 1 is an inclined side view of an embodiment of a bedding out unit in a machine according to the invention.
Figure 2:
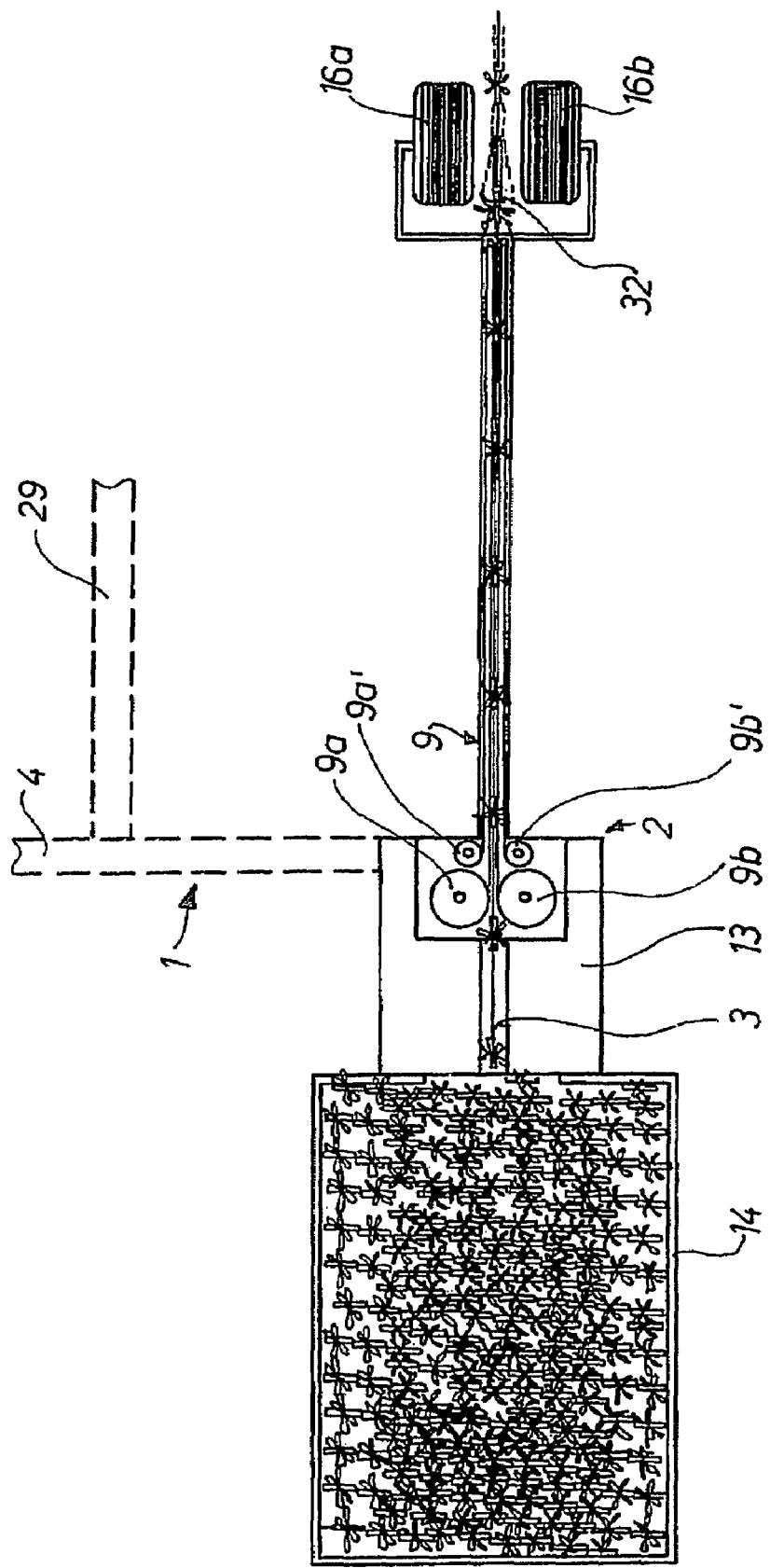
FIG. 2 is a top view of the embodiment of FIG. 1, where a portion of the frame and the carrying pole of the machine have only been indicated by means of a dotted line.

The bedding out unit 2 shown in FIG. 1 forms part of the machine 1 according to the invention and can be used for bedding out seed or plant tapes 3 and optionally germinating units. As shown in FIG. 2, the machine 1 includes a frame 4, only a portion thereof being shown. If necessary, several bedding out unit 2 can optionally be arranged at regular intervals on the frame 4. This frame 4 is further provided with a carrying pole 29 for connecting the machine to the front of a tractor not shown. The machine can also be self-propelling.

The front end of the bedding out unit is indicated at 2a and the rearmost end at 2b. While running, the bedding out unit is moved from the right towards the left of FIG. 2.

Figure 10:
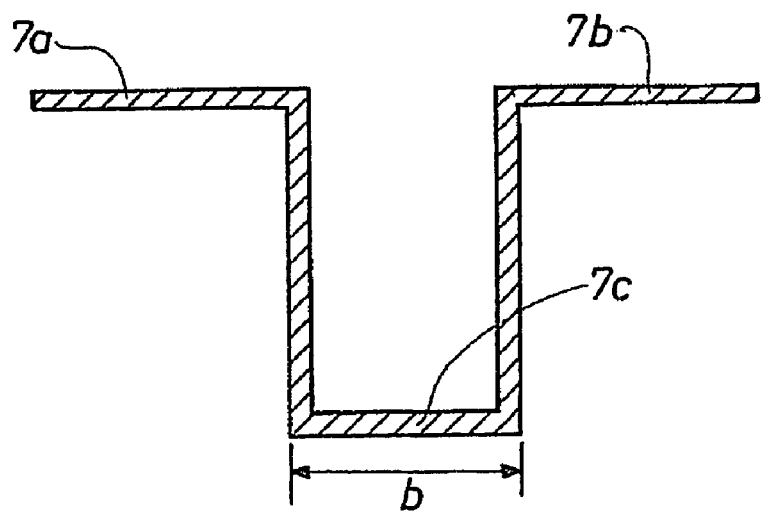
FIG. 10 is a cross sectional view of the plough member of the bedding out unit, the main conveyor being removed.

The bedding out unit 2 includes a plough member 6 of a substantially U-shaped cross section, cf. FIG. 10. The upper end of the U is provided with substantially horizontally projecting stabilising webs 7a and 7b adapted to stabilise the plough member on the ground while the machine is pushed forwards by the tractor. The plough member is of a length L of at least approximately 30 cm and a width b measured across the U of 15 to 50 mm, preferably approximately 30 mm, cf. FIG. 10. A very inclined main conveyor is mounted on the plough member 6, cf. FIG. 1. This main conveyor includes two continuous conveyor belts 10 and 11, cf. FIG. 11, which are arranged adjacent one another and with an adjustable interspace a, cf. below. As shown in FIG. 1, the main conveyor 9 extends across a major portion of the length of the plough member 6, preferably across the entire length of said plough member. A supporting plate 13 is provided at the front end of the bedding out unit, said supporting plate 13 being adjustable with respect to height and/or angle. This supporting plate 13 is adapted to receive at least one supply container for seed or plant tapes or for germinating units 3 which can be pulled out of said container. A supply container is diagrammatically indicated at 14. The adjustment with respect to height and/or angle of the supporting plate 13 relative to the plough member can be carried out in a manner known per se. At least two pressure wheels 16a and 16b can be mounted on the rear end of the machine, preferably on the stabilising webs 7a and 7b, said pressure wheels pressing down the earth around the seed or plant tape portion just bedded out in a furrow 32.

Figure 3:
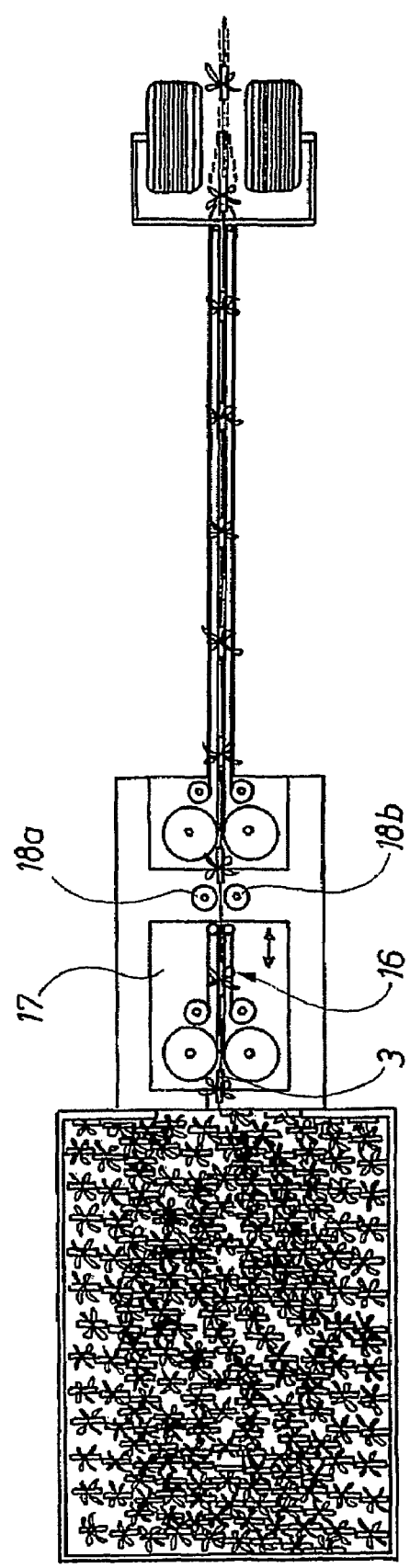
FIG. 3 is a top view of an embodiment of the machine provided with a pre-conveyor in addition to a main conveyor, and where a pair of alternative separation rollers appear.
Figure 4:
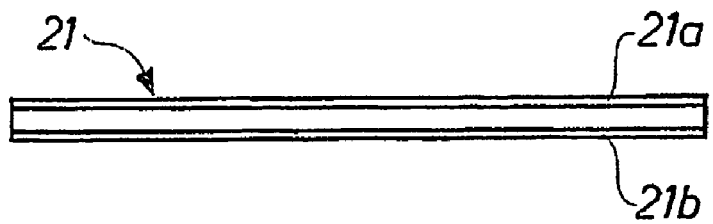
FIG. 4 is a perspective view of a profile guideway.
Figure 12:
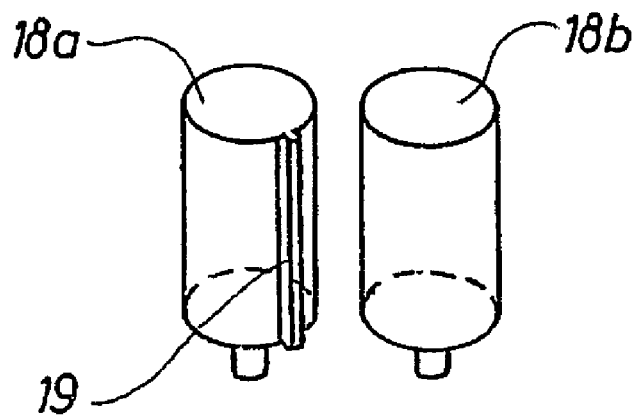
FIG. 12 is a perspective view of two separation rollers.

As illustrated in FIG. 3, a pre-conveyor 16 can be inserted between the supporting plate 13 and the main conveyor 9. This pre-conveyor is adapted to run at a speed slightly slower than the speed of the main conveyor 9. As shown, the pre-conveyor can be mounted on a slide 17 reciprocating in the longitudinal direction of the machine so as to render it possible to form separate germinating units in case of a break of the seed and plant tape. In order to produce the break, two co-acting separation rollers 18a, 18b can optionally be provided, cf. FIGS. 3 and 12. Preferably one or the other or both separation rollers include a separation rib 19 assisting in producing a break in the seed and plant tape. The peripheral speed of the separation rollers correspond to the advancing speed of the main conveyor. As a result it is possible in a very simple manner to separate each germinating unit 3' from the seed or plant tape. Alternatively, a knife known per se can be arranged at the position and instead of the separation rollers 18a, 18b and be used for cutting the seed or plant tape into small tape pieces, viz. germinating units. Immediately upon cutting off a germinating unit, said unit is catched by the front end of the main conveyor 9.

Figure 5:
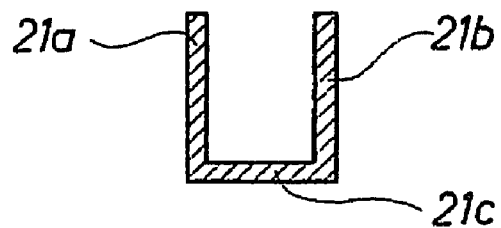
FIG. 5 is a cross sectional view of a profile guideway.
Figure 11:
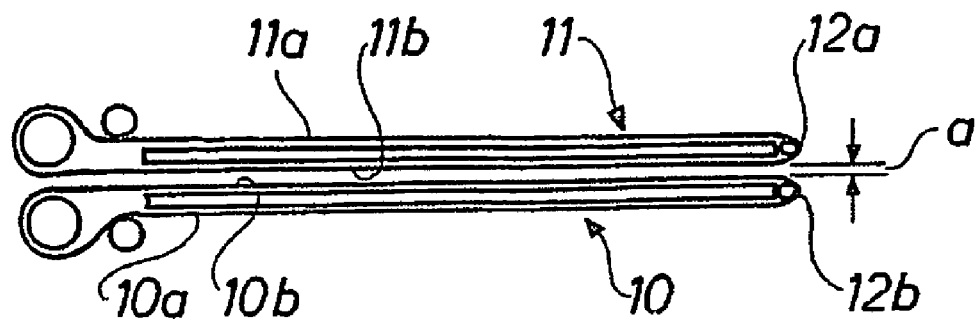
FIG. 11 is a top view of a portion of the main conveyor.
Figure 13:
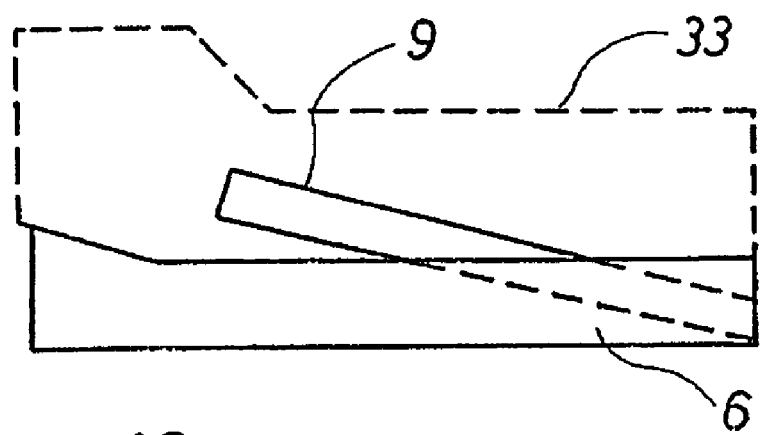
FIG. 13 is a diagrammatic side view of the bedding out unit provided with a protecting shield, the drive means of the main conveyor and the supply container being omitted.

The supporting plate 13 is adjustable with respect to height and can optionally be adapted to include many supply containers 14. These containers can either be stacked atop one another or be juxtaposed. This feature is, however, not shown. As shown in FIGS. 1 and 11, the main conveyor 9 can include two driving rollers 9a and 9b as well as tightening rollers 9a' and 9b'. The driving roller and the tightening roller are arranged relatively close to one another. The continuous belt can pass around the tightening roller 9a' and an end roller 12a. Correspondingly, the continuous belt 10 can pass around the driving roller 9b, the tightening roller 9b' and the end roller 12b. In connection with the outer path 11a and the inner path 11b of the continuous belt 11 it should be noted that these paths can be mutually separated by means of the free vertical guiding web 21a on a profile guideway 21, cf. FIGS. 5 and 13. Correspondingly, the outer belt path 10a and the inner belt path 10b of the continuous belt 10 can be separated by means of the guiding web 21b.

Figure 6:
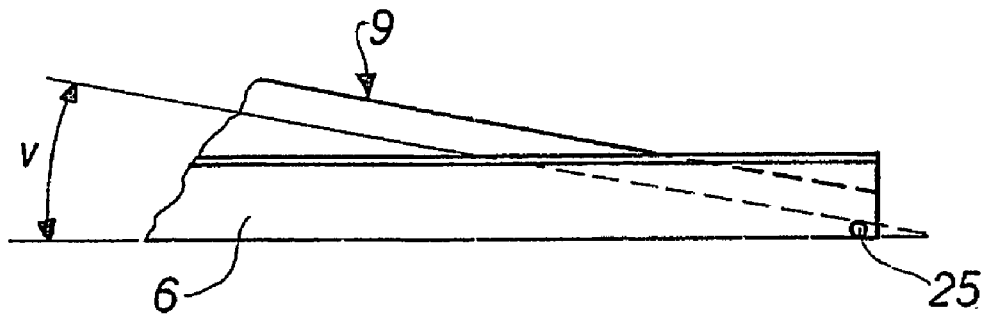
FIG. 6 is a sectional view of the rearmost end of the plough member and showing how the profile guideway is hinged to said plough member.

As illustrated in FIG. 6, the profile guideway 21 of the main conveyor can at the bottom web 21c of its U-shaped cross section be hinged 25 to the bottom web 7c of the U-shaped cross section of the plough member 6.

The continuous conveyor belts 10 and 11 as well as the continuous belt of the pre-conveyor 16 can be made of plastics or textile presenting a high strength. The belts can present a rough surface on the side facing the seed or plant tape or portions thereof, said rough surface for instance being coated with emery or very fine sand or be provided with small friction-producing projections of rubber or plastics.

As mentioned in connection with FIG. 11, two rollers 12a and 12b can be mounted at the rearmost end of the main conveyor 9. These two rollers can optionally be removed and then the ends of the webs 21a and 21b are rounded which, however, can involve a slightly increased wear and tear of the continuous belts.

Figure 7:
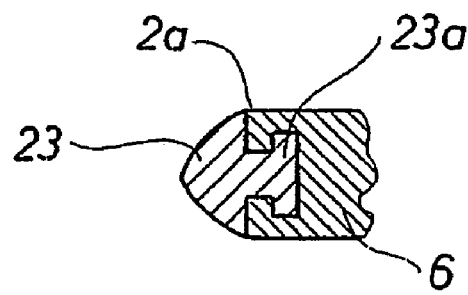
FIG. 7 is a cross sectional view of the front end of the plough member provided with a nose member made of ceramic material.

As illustrated in FIG. 7, a nose member 23 of ceramic material can be provided on the front end 2a of the plough member. The securing can be provided by means of a groove 23a shaped on the nose member, said groove fitting in a corresponding groove in the front end of the plough member 6.

As illustrated in FIG. 1, the driving rollers 9a and 9b can be driven by means of drive means, such as an electromotor 24 supplied with power from the tractor. The drive can optionally also include co-acting gear wheels not shown or a drive not shown utilizing a toothed belt.

Figure 8:
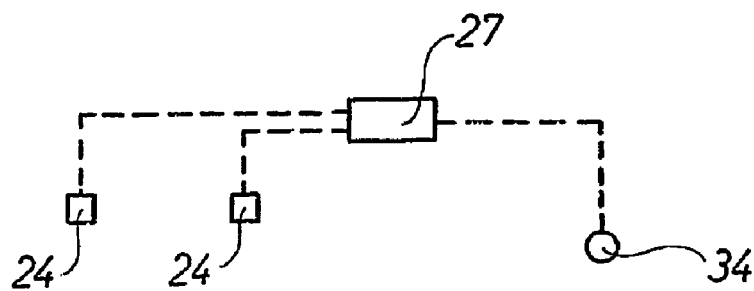
FIG. 8 is a diagrammatic view of an electric circuit showing how the signal of the sensor can be transmitted to the drive means of the conveyor through a program control unit.

A sensor 34 for detecting the speed of the plough member relative to the surrounding ground can be mounted on said plough member 6, preferably at the end of said plough member, such as on the top side of one of the stabilising webs 7a and 7b, cf. FIGS. 1 and 10. As shown in FIG. 8, this sensor can form part of an electric circuit where the signals of the sensor can be transmitted to a preferably remote-controlled program control unit 27. This program control unit 27 is adapted to transmit command signals to the driving electromotor 24 and to the optional driving electromotor for the pre-conveyor. The command signals to the electromotor 24 and the second driving electromotor are such that the conveyors in question run at a slightly higher speed than the speed of the plough member 6 relative to the ground. The tractor driver can reset the program control unit 27 by means of a remote control in such a manner that the main conveyor and optionally also the pre-conveyor advantageously runs at a speed differing from the speed of the plough member.

The upper portion of the plough member 6 and especially the outer paths 10a, 11a of each continuous belt of the main conveyor can be covered by a protecting shield 30, cf. FIG. 1. The top side of the bedding out unit 2 as well as the supporting plate 13 for the supply container can be covered by one or more, preferably transparent protecting shields made of for instance Plexiglas or plastics, cf. FIG. 13.

The plough member 6 can be of a length L of 50 to 130 cm, preferably 100 to 125 cm, especially approximately 110 cm, cf. FIG. 1. The angle v of the main conveyor 9 relative to horizontal can be adjustable within the angular range of 0 to 45° C., especially 0 to 35° C., cf. FIG. 6. The adjustment is carried out in a manner known per se.

The carrying pole 29 of the frame 4 can be adapted to be secured on a parallelogram suspension not shown on the front end of the tractor.

Figure 9:
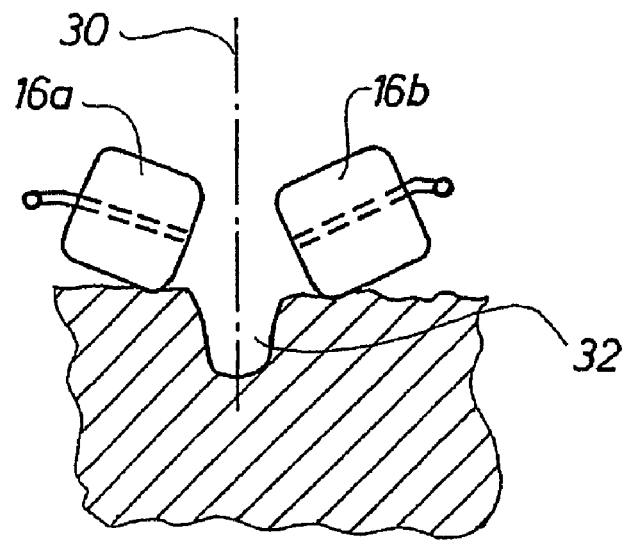
FIG. 9 is a sectional view taken along the line IX-IX of FIG. 1 and showing how the pressure wheels can be slightly inclined relative to the longitudinal mid-plane of the furrow.

In connection with the two pressure wheels 16a and 16b at the rearmost end 2b of the plough member 6 it should be noted that said two pressure wheels can be rather wide and mounted in a slightly inclined manner relative to the longitudinal mid-plane of the furrow, cf. FIG. 9, with the result that said pressure wheels assist in a very reliable compression of the earth immediately after the bedding out of the seed tape.

The free distance a between the inner paths 10b and 11b of the conveyor belts 10 and 11 can be approximately 4 mm, cf. FIG. 10. The distance a can be adjustable by for instance the guiding webs 21a being adapted to be parallelly displaced relative to the guiding web 21*b* and thereby be fixed in a new position on the bottom web 21*c*. Some slots not shown can for instance be shaped in the bottom web 21*c*, said slots allowing screw shafts arranged on the bottom side of the guiding web to be fixed therein by means of a nut.

It should be noted that when the individual germinating unit, viz. plant pocket, is torn or cut off and moved forward by means of the main conveyor 9, then the angle relative to vertical of the germinating unit just before it enters said main conveyor 9 is maintained during the movement on said main conveyor 9. The latter situation has been indicated at 3" in FIG. 1 where the germinating unit was vertically positioned just before it entered the inclined main conveyor 9 and continues to be vertically positioned relative to said main conveyor 9. The machine allows a pulling out of seed or plant tapes or of germinating units from boxes arranged at various heights above one another.

The adjustment with respect to height and/or angle of the supporting plate can be carried out automatically. The same applies to the adjustment of the angle v of inclination of the main conveyor. The latter adjustment can for instance be carried out by means of a gear wheel-rack-connection where the gear wheel is driven by means of an electromotor.

Figure 14:
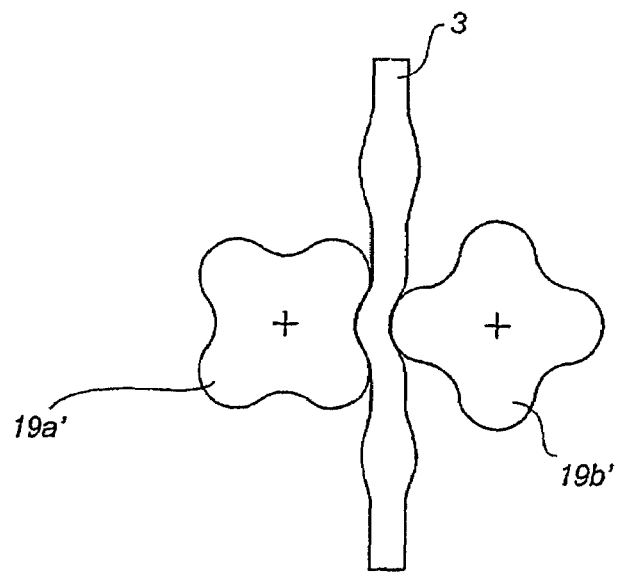
FIG. 14 illustrates two co-acting driving gear wheels for advancing a seed or plant tape.

The invention may be modified in many ways without thereby deviating from the scope of the invention. Thus, the machine can be self-propelling. In the embodiment shown in FIG. 14, the tape 3 is pulled forwards by a conveyor in form of two co-acting gear wheels 19*a'*, 19*b'* engaging the pockets of said tape 3, where each pocket includes one or more germinating units.

The invention claimed is:

1. A machine for bedding out seed or plant tapes comprising:
    a frame;
    a carrying pole to be connected to a front of a tractor frame;
    at least one bedding out unit provided with a plough member mounted on said frame, wherein the plough member is associated with a conveyor including at least one continuous belt, and wherein the bedding out unit is provided with a supporting plate for supporting at least one supply container for the seed or plant tape to be bedded out in a furrow produced by the plough member, the bedding out unit including a plough member of a substantially U-shaped cross section, where top webs of the U are substantially horizontally projecting stabilizing webs, and where said plough member is of a length (L) of at least approximately 30 cm and a width (b) measured across the U of 15 to 50 mm, the conveyor of said plough member being formed by an inclined main conveyor with two continuous conveyor belts arranged adjacent, but with a distance (a) to one another, said main conveyor extending over most of the entire length (L) of the plough member, the supporting plate being adjustable with respect to at least one of a height and angle, and at least two pressure wheels being mounted on a rear end of the machine for pressing down the earth around the seed or plant tape portion which has just been bedded out in the furrow;
    a pre-conveyor provided between the supporting plate for the supply container and the main conveyor, said pre-conveyor being adapted to run at a speed slightly slower than a speed of the main conveyor, and wherein said pre-conveyor is mounted on a slide reciprocable in the longitudinal direction of the machine; and
    a pair of co-acting separation rollers mounted between the main conveyor and the pre-conveyor, a peripheral speed of the separation rollers corresponding substantially to an advancing speed of the main conveyor.

2. Machine as claimed in claim 1, further comprising a knife mounted between the main conveyor and the pre-conveyor for cutting the seed or plant tape into small tape pieces, where each tape piece includes one or more seeds.

3. Machine as claimed in claim 1, wherein the main conveyor includes two driving rollers and two tightening rollers arranged adjacent one another, as well as two continuous conveyor belts extending around their respective free guiding webs of a profile guideway presenting a substantially U-shaped cross section.

4. Machine as claimed in claim 1, wherein the profile guideway of the conveyor at a bottom web of its U-shaped cross section is hinged to a bottom web of the U-shaped cross section of the plough member.

5. Machine as claimed in claim 1, wherein the conveyor belts of the continuous conveyors are made of plastics or textile presenting a high strength, and on the side facing the seed or plant tape or portions thereof these conveyor belts present a rough friction-producing surface.

6. Machine as claimed in claim 5, wherein said rough friction-producing surface is coated with emery or provided with friction-producing projections.

7. Machine as claimed in claim 6, wherein said projections comprise rubber or plastic.

8. Machine as claimed in claim 1, further comprising two auxiliary rollers arranged at the rear end of the profile guideway, where the conveyor belts of the main conveyor can run around their respective auxiliary rollers.

9. Machine as claimed in claim 1, wherein the machine is self-propelled.

10. Machine as claimed in claim 1, wherein said width (b) is approximately 30 mm.

11. Machine as claimed in claim 1, wherein said distance (a) is adjustable.

12. Machine as claimed in claim 1, wherein said main conveyor (a) extends over the entire length (L) of the plough member.

13. Machine as claimed in claim 1, wherein at least one of the separation rollers includes at least one separation rib.

14. Machine as claimed in claim 1, further comprising a knife mounted between the main conveyor and the pre-conveyor for cutting the seed or plant tape into small tape pieces, where each tape piece includes one or more seeds.

15. Machine as claimed in claim 1, wherein the main conveyor includes two driving rollers and two tightening rollers arranged adjacent one another, as well as two continuous conveyor belts extending around their respective free guiding webs of a profile guideway presenting a substantially U-shaped cross section.

16. Machine as claimed in claim 1, wherein the profile guideway of the conveyor at the bottom web of its U-shaped cross section is hinged to the bottom web of the U-shaped cross section of the plough member.

17. Machine as claimed in claim 1, wherein the conveyor belts of the continuous conveyors are made of plastics or textile presenting a high strength, and on the side facing the seed or plant tape or portions thereof these conveyor belts present a rough surface.

* * * * *